United States Patent
Nishikawa et al.

(10) Patent No.: US 12,525,060 B2
(45) Date of Patent: Jan. 13, 2026

(54) WORK ESTIMATION DEVICE, WORK ESTIMATION METHOD, AND NON-TRANSITORY COMPUTER READABLE MEDIUM

(71) Applicant: Mitsubishi Electric Corporation, Tokyo (JP)

(72) Inventors: Keishi Nishikawa, Tokyo (JP); Takaya Taniguchi, Tokyo (JP); Kenji Takii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 314 days.

(21) Appl. No.: 18/210,948

(22) Filed: Jun. 16, 2023

(65) Prior Publication Data

US 2023/0326251 A1 Oct. 12, 2023

Related U.S. Application Data

(63) Continuation of application No. PCT/JP2021/003099, filed on Jan. 28, 2021.

(51) Int. Cl.
*G06V 40/20* (2022.01)
*G06T 7/70* (2017.01)
(Continued)

(52) U.S. Cl.
CPC ............ *G06V 40/20* (2022.01); *G06T 7/70* (2017.01); *G06V 10/70* (2022.01); *G06V 20/41* (2022.01);
(Continued)

(58) Field of Classification Search
None
See application file for complete search history.

(56) References Cited

U.S. PATENT DOCUMENTS

2014/0331157 A1* 11/2014 Yoshigahara .......... G16H 40/20
715/765
2015/0003678 A1* 1/2015 Watanabe .............. B25J 9/1697
382/103
(Continued)

FOREIGN PATENT DOCUMENTS

CA 2 848 997 A1 5/2013
CN 104871525 A 8/2015
(Continued)

OTHER PUBLICATIONS

German Office Action for German Application No. 11 2021 006 095.3, dated Feb. 28, 2024, with English translation.
(Continued)

*Primary Examiner* — Andrew H Lam
(74) *Attorney, Agent, or Firm* — Birch, Stewart, Kolasch & Birch, LLP

(57) ABSTRACT

A work estimation device (200) includes a watching region estimation unit (220), an object detection unit (210), a contact degree calculation unit (230), and a work estimation unit (250). The watching region estimation unit (220) estimates a watching region which is a region a user watches, with using information indicating a line of sight of the user. The object detection unit (210) detects, from a video that shows a work object the user is using and at least one target candidate object which is a candidate for a work target of the user, the work object and the at least one target candidate object. The contact degree calculation unit (230) calculates a contact degree indicating a degree of contact between the work object and each target candidate object which is included in the at least one target candidate object, on a basis of the watching region. The work estimation unit (250) estimates work of the user on a basis of the work object and the contact degree.

10 Claims, 14 Drawing Sheets

(51) Int. Cl.
*G06V 10/70* (2022.01)
*G06V 20/40* (2022.01)

(52) U.S. Cl.
CPC .............. *G06T 2207/10016* (2013.01); *G06T 2207/30196* (2013.01)

(56) References Cited

U.S. PATENT DOCUMENTS

| | | | |
|---|---|---|---|
| 2015/0331486 A1 | 11/2015 | Okubo et al. | |
| 2017/0173798 A1 | 6/2017 | Watanabe et al. | |
| 2018/0300389 A1* | 10/2018 | Tajima | G06Q 50/01 |
| 2020/0230821 A1 | 7/2020 | Watausbe et al. | |
| 2023/0177716 A1* | 6/2023 | Tsuda | G06V 10/25 382/103 |

FOREIGN PATENT DOCUMENTS

| | | |
|---|---|---|
| DE | 10 2014 212 304 A1 | 12/2014 |
| JP | 2013-114315 A | 6/2013 |
| JP | 2015-11526 A | 1/2015 |
| JP | 2018-195052 A | 12/2018 |
| JP | 2018-206321 A | 12/2018 |
| JP | 2019-144861 A | 8/2019 |
| WO | WO 2013/076917 A2 | 5/2013 |
| WO | WO 2017/222070 A1 | 12/2017 |
| WO | WO 2018/163555 A1 | 9/2018 |

OTHER PUBLICATIONS

Zhu et al., "A review of Video Object Detection: Datasets, Metrics and Methods," Applied Sciences, vol. 10, No. 21, 2020, pp. 1-24.
International Search Report (PCT/ISA/210) issued in PCT/JP2021/003099, dated Apr. 13, 2021.
Yamada et al., "Classification of Ego-Actions based on Salient Object Detection", 2013 ITE Annual Convention, Aug. 28-30, 2013, 3 pages.
Chinese Office Action and Search Report for Chinese Application No. 202180091309.4, dated Sep. 6, 2025, with English translation.

* cited by examiner

WORK ESTIMATION DEVICE, WORK ESTIMATION METHOD, AND NON-TRANSITORY COMPUTER READABLE MEDIUM

CROSS REFERENCE TO RELATED APPLICATIONS

This application is a Continuation of PCT International Application No. PCT/JP2021/003099, filed on Jan. 28, 2021, which is hereby expressly incorporated by reference into the present application.

TECHNICAL FIELD

The present disclosure relates to a work estimation device, a work estimation method, and a work estimation program.

BACKGROUND ART

In On-the-Job Training (OJT) education related to equipment maintenance work, there is a demand for an education system that replaces OJT education in order to reduce the burden on supervisors or educators, the cost of education, and so on. In the education system that replaces OJT education related to the maintenance work, it is desirable to provide a user who learns maintenance work with useful information about the work the user has done. In order to achieve this, the education system needs to estimate the work the user does.

Patent Literature 1 discloses, in a video of a user's first-person viewpoint, a technique of improving recognition precision of behavior of the user by detecting an object of interest the user pays attention to, with using a target-object detection result and an attention map, and by performing behavior recognition on a basis of information combination of the object of interest and an object of non-interest.

CITATION LIST

Patent Literature

Patent Literature 1: JP 2015-011526 A

SUMMARY OF INVENTION

Technical Problem

A behavior recognition method disclosed in Patent Literature 1 has a problem that, when a plurality of objects appear within an angle of view of the video of the user viewpoint, even if the user is not performing any behavior, the user may be erroneously recognized as performing certain behavior. In a specific example, according to this behavior recognition method, when the video of the user viewpoint shows a work target of the user and a tool the user uses in the work, even if the user does not use the tool, it may be decided that the user is doing the work.

An objective of the present disclosure is to improve precision of estimating work of a user by detecting contact between a work object and a target candidate object which is a candidate for a work target.

Solution to Problem

A work estimation device according to the present disclosure includes:
a watching region estimation unit to estimate a watching region which is a region a user watches, with using information indicating a line of sight of the user;
an object detection unit to detect, from a video that shows a work object the user is using and at least one target candidate object which is a candidate for a work target of the user, the work object and said at least one target candidate object;
a contact degree calculation unit to calculate a contact degree indicating a degree of contact between the work object and each target candidate object which is included in said at least one target candidate object, on a basis of the watching region; and
a work estimation unit to estimate work of the user on a basis of the work object and the contact degree.

Advantageous Effects of Invention

According to the present disclosure, a contact degree calculation unit finds a contact degree indicating a degree of contact between a work object and each target candidate object which is included in at least one target candidate object on a basis of a region a user is watching, and a work estimation unit estimates work of a user on a basis of the contact degree. Therefore, according to the present disclosure, precision of estimating the work of the user can be improved by detecting contact between the work object and the target candidate object which is a candidate for the work target.

DESCRIPTION OF EMBODIMENTS

Figure 1:
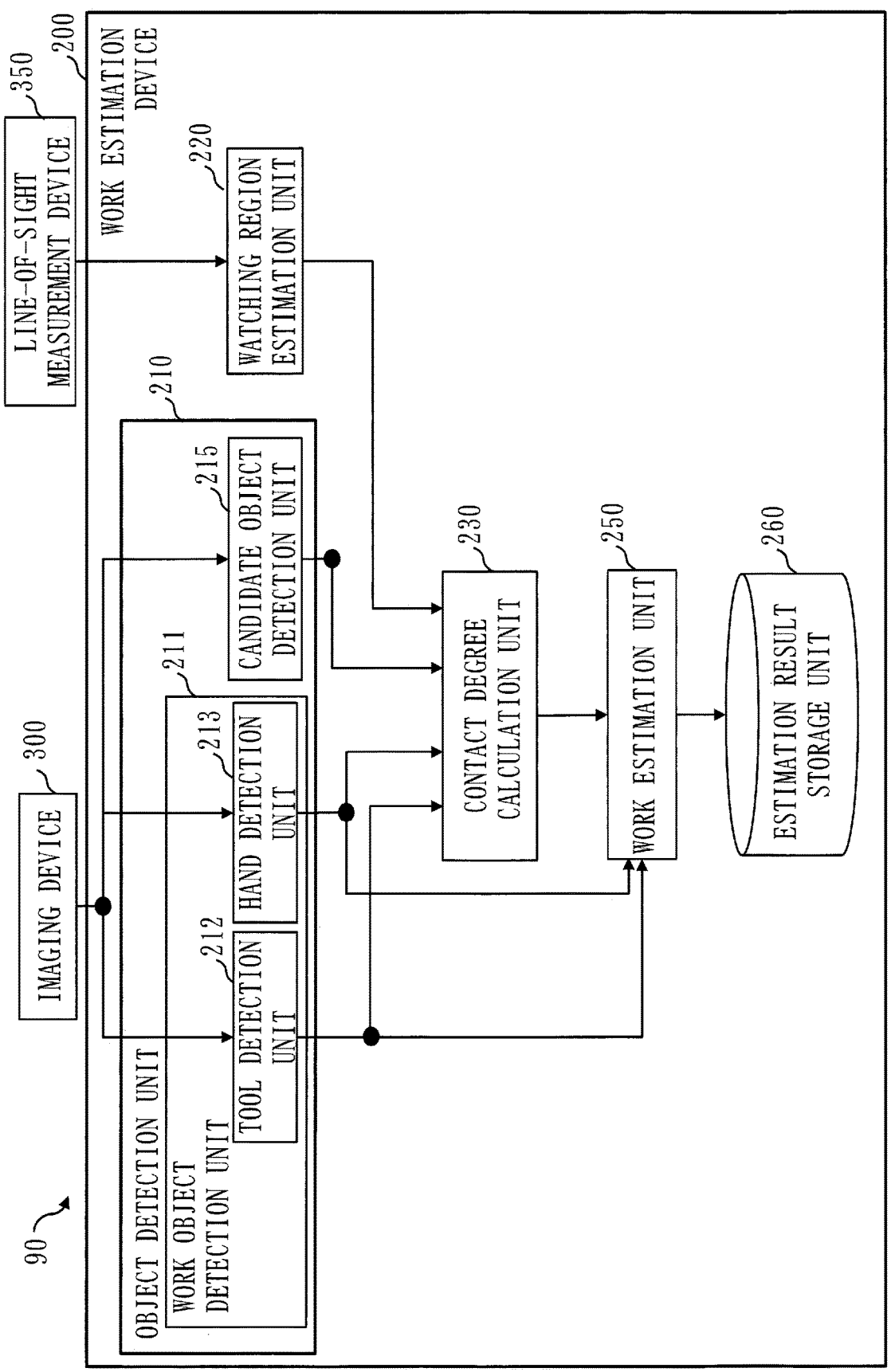
FIG. 1 presents a software configuration example of a work estimation device 200 according to Embodiment 1.

In description and drawings of the embodiment, the same elements and the equivalent elements are denoted by the same reference sign. Description of the elements denoted by the same reference sign will be omitted or simplified as appropriate. Arrows in the drawings mainly illustrate data flows or process flows. Also, a term "unit" may be replaced by "circuit", "stage", "procedure", "process", or "circuitry" as appropriate.

Embodiment 1

The Present Embodiment Will be Described Below in Detail with Referring to drawings.

Description of Configurations

FIG. 1 illustrates a configuration example of a work estimation system 90 and a software configuration example of a work estimation device 200. The work estimation system 90 is provided with the work estimation device 200, an imaging device 300, and a line-of-sight measurement device 350. A black dot in FIG. 1 signifies that lines in contact with the black dot are connected to each other. If a black dot is not illustrated at a portion where a plurality of lines intersect, the relevant plurality of lines are not in contact with each other.

The imaging device 300 is a device to photograph how a user works, and its specific example is a camera. The user is a target of estimation by the work estimation system 90 as to what work he or she is doing. Sometimes the user may be checking work contents or taking a rest instead of working. The user need not be a human being but may be a robot or the like. The imaging device 300 transmits an image photographed by the imaging device 300 to the work estimation device 200 as a pickup image. The pickup image may be a video footage or one or more pictures. The pickup image may a red-green-blue (RGB) image or a depth image, or may contain both. The imaging device 300 may be formed of a plurality of devices.

The line-of-sight measurement device 350 is a device to measure a line of sight of the user. In a specific example, the line-of-sight measurement device 350 is a device provided with a camera, which a user wears on the head. The line-of-sight measurement device 350 transmits line-of-sight measurement information indicating a result of measurement of the line of sight of the user to the work estimation device 200. The line-of-sight measurement device 350 may be formed of a plurality of devices.

The work estimation device 200 need not be directly connected to at least one of the imaging device 300 and the line-of-sight measurement device 350. The work estimation device 200 may be connected to an external recording device such as a recorder recorded with data transmitted to the work estimation device 200 by at least one of the imaging device 300 and the line-of-sight measurement device 350. The work estimation device 200 may receive information reproduced from data recorded, in advance, in the relevant recording device.

The work estimation device 200 is provided with an object detection unit 210, a watching region estimation unit 220, a contact degree calculation unit 230, a work estimation unit 250, and an estimation result storage unit 260. The work estimation device 200 estimates the work the user does, on a basis of information from the imaging device 300 and the line-of-sight measurement device 350.

The object detection unit 210 detects an object, and is provided with a work object detection unit 211 and a candidate object detection unit 215. The term "object" collectively refers to a target candidate object and a work object. The target candidate object is a candidate for an object that is a work target of the user. The work object is an object the user uses in the work, and its specific example is one or both of a hand of the user and a tool the user is using. The work object may be formed of a plurality of objects, for example, both hands of the user, one hand of the user and a tool, or the like. The object detection unit 210 detects, from a video that shows a work object the user is using and at least one target candidate object which is a candidate for the work target of the user, the work object and the at least one target candidate object. Sometimes an image and a video are synonymous.

The work object detection unit 211 detects the work object. The work object detection unit 211 is provided with a tool detection unit 212 and a hand detection unit 213.

The tool detection unit 212 detects the tool the user is using, on a basis of the pickup image.

The hand detection unit 213 detects a hand of the user on a basis of the pickup image.

The candidate object detection unit 215 detects a target candidate object. The candidate object detection unit 215 is also called a target object detection unit.

The watching region estimation unit 220 estimates a watching region with using information measured by the line-of-sight measurement device 350 and indicating a line of sight of the user. The watching region is a region the user watches. The watching region may be a two-dimensional distribution having an arbitrary shape, may be a distribution which has a maximal value at a viewpoint position and which is set in advance, or may be a heat map calculated with using time-series data in which the viewpoint position is recorded. The viewpoint position is a position indicated by the line-of-sight measurement information, which is a position of the viewpoint of the user. The watching region estimation unit 220 may estimate the watching region with using time-series data indicating the position of the viewpoint of the user. The watching region may be a region determined in accordance with a distance between a position of each target candidate object and the viewpoint position. In a specific example, within the relevant region, the position of each target candidate object and the viewpoint position are located inside a fixed range.

The contact degree calculation unit 230 calculates a contact degree indicating a degree of contact between the work object and each target candidate object which is included in at least one target candidate object, on a basis of the watching region. The contact degree calculation unit 230 is also called a calculation unit of a relationship value of a target object position within a watching region. The contact degree calculation unit 230 may calculate a weight corresponding to each target candidate object included in at least one target candidate object on a basis of the watching region, and may find the contact degree with using the calculated weight. The contact degree calculation unit 230 may find the contact degree on a basis of a distance between the work object and each target candidate object which is included in at least one target candidate object. The contact degree calculation unit 230 may find the contact degree on a basis of disposition of the work object and disposition of each target candidate object which is included in at least one target candidate object. The contact degree calculation unit 230 may find the contact degree on a basis of a region where the work object and each target candidate object which is included in at least one target candidate object overlap. The contact degree calculation unit 230 may find a contact degree by appropriately combining weighting by information indicating the watching region, a work object, and a target candidate object.

The work estimation unit 250 estimates the work of the user on a basis of an output from the object detection unit 210 and an output from the contact degree calculation unit 230. The work estimation unit 250 estimates the work of the user on a basis of the work object and the contact degree. The work estimation unit 250 may estimate the work of the user by a rule-based estimation technique or with using a learning model.

The estimation result storage unit 260 stores a result the work estimation unit 250 has obtained by estimating the work. The estimation result storage unit 260 is also called a work estimation result storage unit, and may be located outside the work estimation device 200.

Figure 2:
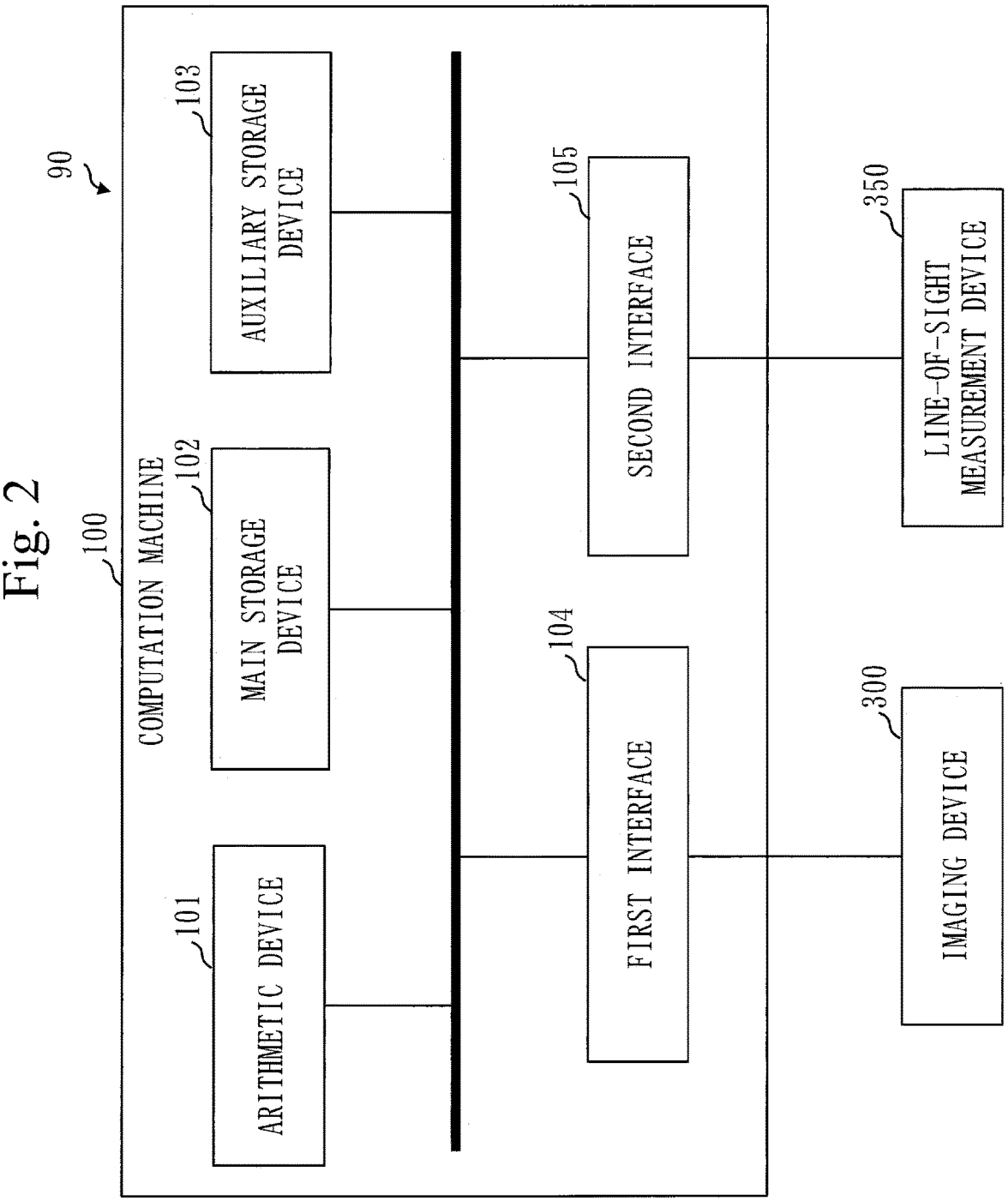
FIG. 2 presents a hardware configuration example of the work estimation device 200 according to Embodiment 1.

FIG. 2 illustrates a hardware configuration example of the work estimation device 200. The work estimation device 200 is formed of a computation machine 100, as illustrated in FIG. 2. The computation machine 100 is constituted of an arithmetic device 101, a main storage device 102, an auxiliary storage device 103, a first interface 104, and a second interface 105, and is called a computer as well. The work estimation device 200 may be formed of a plurality of computation machines 100.

The arithmetic device 101 is an integrated circuit (IC) to perform arithmetic processing and controls hardware provided to the computer. In a specific example, the arithmetic device 101 is a central processing unit (CPU), a digital signal processor (DSP), or a graphics processing unit (GPU). The work estimation device 200 may be provided with a plurality of arithmetic devices that substitute for the arithmetic device 101. The plurality of arithmetic devices share roles of the arithmetic device 101.

The main storage device 102 is a device that stores signals from the arithmetic device 101 temporarily. In a specific example, the main storage device 102 is a random-access memory (RAM). Data stored in the main storage device 102 is saved in the auxiliary storage device 103 as necessary.

The auxiliary storage device 103 is a device that stores signals from the arithmetic device 101 in a long-term range. In a specific example, the auxiliary storage device 103 is a read-only memory (ROM), a hard disk drive (HDD), or a flash memory. Data stored in the auxiliary storage device 103 is loaded to the main storage device 102 as necessary. The main storage device 102 and the auxiliary storage device 103 may be constituted integrally.

The first interface 104 is a device that receives signals from the imaging device 300 connected to the computation machine 100. In a specific example, the first interface 104 is a universal serial bus (USB) terminal, or a communication device such as a communication chip and a network interface card (NIC).

The second interface 105 is an interface similar to the first interface 104. The second interface 105 is a device to receive signals from the line-of-sight measurement device 350. The first interface 104 and the second interface 105 may be constituted integrally.

A work estimation program is stored in the auxiliary storage device 103. The work estimation program is a program that causes the computer to implement functions of individual units provided to the work estimation device 200. The work estimation program is loaded to the main storage device 102 and run by the arithmetic device 101. The functions of the individual units provided to the work estimation device 200 are implemented by software.

Data used when running the work estimation program, data obtained by running the work estimation program, and so on are stored in a storage device as appropriate. The individual units in the work estimation device 200 utilize the storage device as appropriate. In a specific example, the storage device is formed of at least one of: the main storage device 102; the auxiliary storage device 103; a register in the arithmetic device 101; and a cache memory in the arithmetic device 101. Note that sometimes data and information have the same meaning. The storage device may be independent of the computation machine 100. The estimation result storage unit 260 is formed of the storage device.

Functions of the main storage device 102 and auxiliary storage device 103 may be implemented by another storage device.

The work estimation program may be recorded in a computer-readable non-volatile recording medium. In a specific example, the non-volatile recording medium is an optical disk or a flash memory. The work estimation program may be provided in the form of a program product.

Description of Operations

An operation procedure of the work estimation device 200 corresponds to a work estimation method. A program that implements operations of the work estimation device 200 corresponds to the work estimation program.

Figure 3:
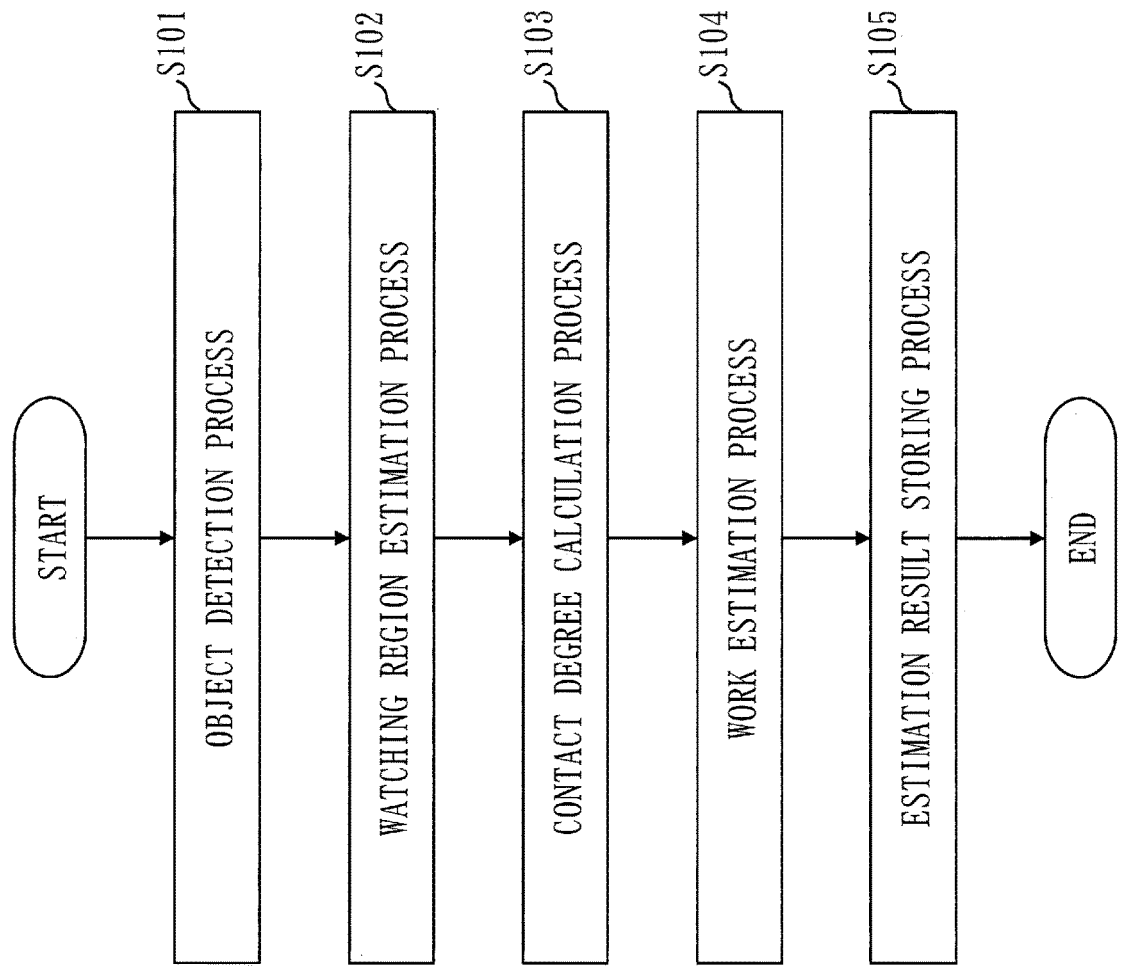
FIG. 3 is a flowchart illustrating operations of the work estimation device 200 according to Embodiment 1.

FIG. 3 is a flowchart illustrating an example of the operations of the work estimation device 200. The operations of the work estimation device 200 will be described with referring to FIG. 3. In description of this flowchart, assume that the pickup image shows one work object and one or more target candidate objects.

(Step S101: Object Detection Process)

The object detection unit 210 receives the pickup image from the imaging device 300, detects the work object and the target candidate object which are shown in the received pickup image, and finds information corresponding to each detected target candidate object. In a specific example, the relevant information includes information indicating: attribute information indicating an attribute of each target candidate object; and an occupied region corresponding to each target candidate object. The occupied region is a region corresponding to a region occupied by each object in the pickup image. The occupied region may be a rectangular region enclosing each object, or may be a set of pixels displaying the objects. A technique of the object detection unit 210 to detect the target candidate object may be a technique which utilizes a marker attached to the target candidate object, or may be a machine-learning-based technique which uses a model that has done learning in advance. The object detection unit 210 also finds an occupied region corresponding to the work object.

(Step S102: Watching Region Estimation Process)

The watching region estimation unit 220 receives the line-of-sight measurement information from the line-of-sight measurement device 350, and estimates the watching region with using the viewpoint position indicated by the received line-of-sight measurement information.

(Step S103: Contact Degree Calculation Process)

The contact degree calculation unit 230 calculates a contact index on a basis of the work object and each target candidate object which are detected by the object detection unit 210, and the watching region estimated by the watching region estimation unit 220. The contact index expresses a degree of contact between the work object and each target candidate object by quantification.

The contact degree calculation unit 230 calculates the contact index on a basis of, in a specific example, any one of (1) distance, (2) overlapping region, (3) distance and direction 1, (4) overlapping region and direction, and (5) distance and direction 2. Calculation on the basis of distance signifies that the contact degree calculation unit 230 finds a contact index corresponding to each target candidate object on a basis of how short or long a distance between the work object and each target candidate object is. Calculation on the basis of overlapping region signifies that the contact degree calculation unit 230 finds a contact index corresponding to each target candidate object on a basis of a size of a region where an occupied region corresponding to each target candidate object and an occupied region corresponding to the work object overlap. Calculation on the basis of direction signifies that the contact degree calculation unit 230 finds the contact index corresponding to each target candidate object on a basis of a direction of the work object with respect to the target candidate object and a direction of the work object. The contact degree calculation unit 230 may calculate the contact index on a basis of all of the distance, the overlapping region, and the direction. A specific example of calculating the contact index will be described below. The direction of the work object is equivalent to the disposition of the work object. The direction of the work object with respect to the target candidate object is based on disposition of the target candidate object and the disposition of the work object.

(1) Distance

A specific example in which the contact degree calculation unit 230 finds the contact index on the basis of distance will now be described. The contact degree calculation unit 230 calculates a score such that the larger a region where an occupied region corresponding to the target candidate object and the watching region overlap and the larger the degree of watching for the overlapping watching region, and the nearer the work object and the target candidate object, then the larger a value of the score corresponding to the target candidate object. The score expresses the contact degree.

Figure 4:
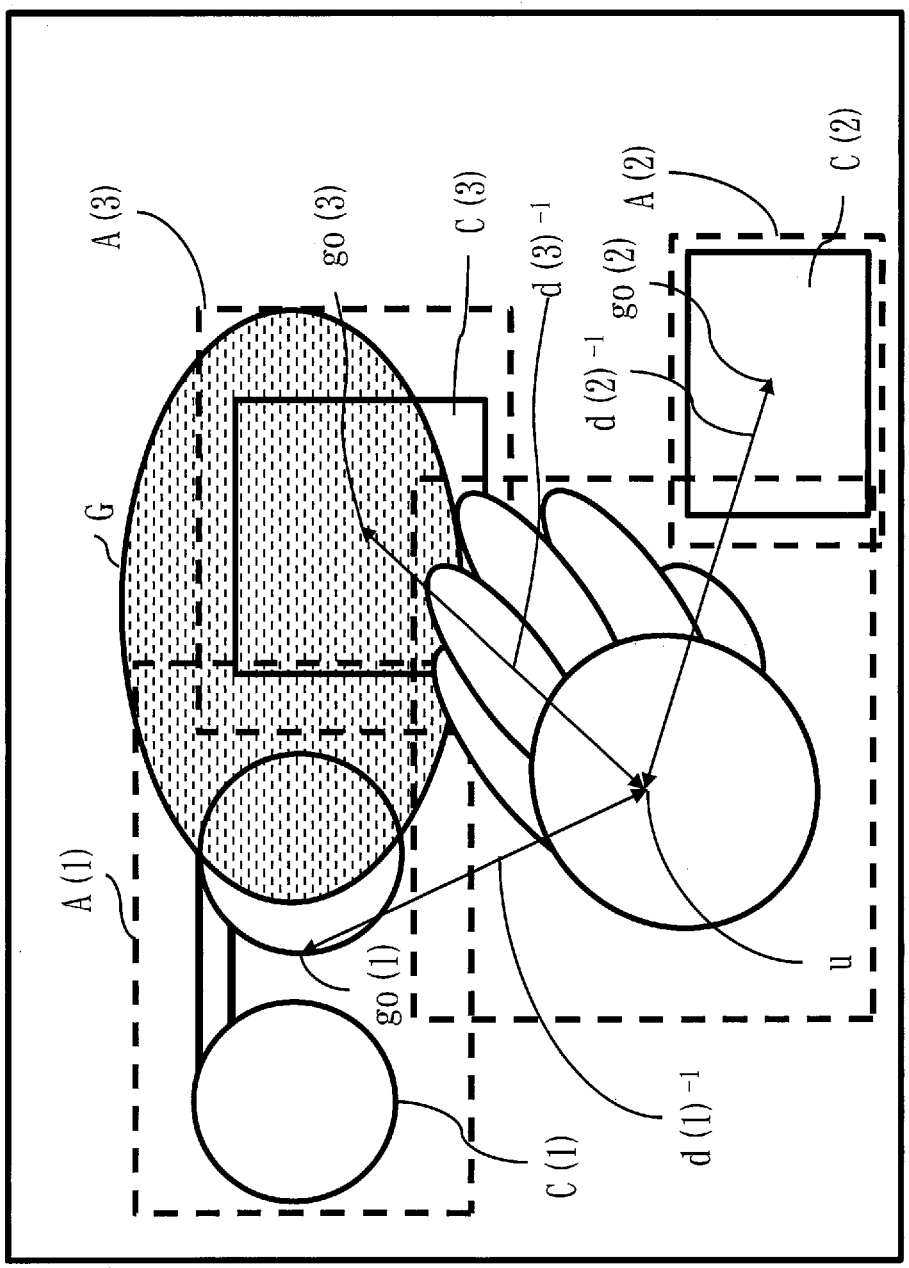
FIG. 4 is a diagram explaining processing of a contact degree calculation unit 230 according to Embodiment 1.

FIG. 4 schematically illustrates a specific example of processing of the contact degree calculation unit 230 with using a sight video. The sight video is a video showing at least part of a sight of the user. A pickup image may be the sight video. The watching region estimation unit 220, the contact degree calculation unit 230, or the like may generate a sight video on a basis of a pickup image. In the following, assume that the contact degree calculation unit 230 executes the processing on a basis of a sight video.

In FIG. 4, an occupied region A(i) (i=1, 2, 3) is an occupied region corresponding to a target candidate object C(i). The occupied region A(i) is a rectangular region enclosing the target candidate object C(i). A centroid go(i) is a centroid of the target candidate object C(i). The work object is a hand, and a centroid u is a position of centroid of the hand. Note that d(i) is an inverse number of a value of distance from the centroid u to the centroid go(i).

Figure 5:
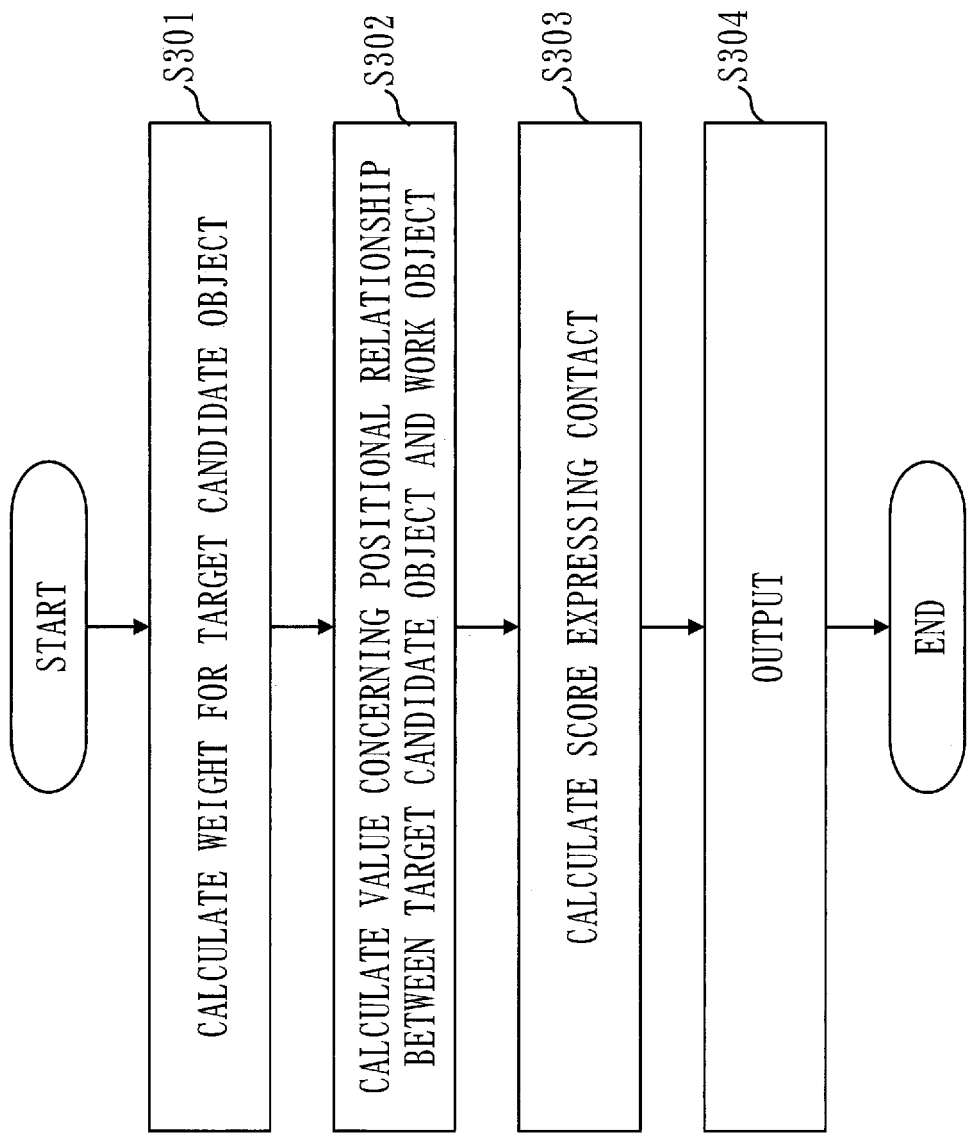
FIG. 5 is a flowchart illustrating operations of the contact degree calculation unit 230 according to Embodiment 1.

FIG. 5 illustrates an example of a process flow of the contact degree calculation unit 230. The processing of the contact degree calculation unit 230 will now be described with referring to FIG. 5.

(Step S301)

The contact degree calculation unit 230 calculates a weight for each target candidate object C(i) (i=1, 2, . . . ) with using information indicating a watching region G.

In a specific example, first, the contact degree calculation unit 230 calculates an overlapping region $Ov(i)(=A(i) \cap G)$ about each target candidate object C(i). The overlapping region Ov(i) indicates a region where the occupied region A(i) and the watching region G overlap. The overlapping region Ov(i) may be a rectangular region enclosing the region where the occupied region A(i) and the watching region G overlap. Both regions are not limited to two-dimensional regions but may be three-dimensional regions. If the both regions are three-dimensional regions, when finding the overlapping region, the contact degree calculation unit 230 decides whether solids corresponding to the individual regions overlap or not. In the following, assume that each region is two-dimensional, and that a function Gf is a function indicating a degree of user's watching in each pixel included in the sight video in the watching region G. That is, assume that the function Gf is a function indicating a watching distribution, and that a function Gf(x, y) indicates a degree of user's watching in a pixel corresponding to a coordinate point (x, y). In a specific example, the function Gf(x, y) is a function whose function value is the highest at a center point of the watching region G. The function value decreases gradually toward an edge of the watching region G. When an area of the overlapping region Ov(i) is 0, processing of a following step need not be executed about a target candidate object C(i) corresponding to the overlapping region Ov(i). That is, in this step, the contact degree calculation unit 230 may narrow down the target candidate objects C(i) on a basis of the watching region G.

Next, the contact degree calculation unit 230 calculates a weight W(i) corresponding to the target candidate object C(i) as indicated in [Formula 1]. The weight W(i) is calculated by dividing an integral value of the function Gf within the overlapping region Ov(i) by a number of pixels within the overlapping region Ov(i).

$$W(i) = \Sigma_{(x,y) \in Ov(i)} Gf(x,y)/|Ov(i)| \qquad [\text{Formula 1}]$$

(Step S302)

The contact degree calculation unit 230 calculates a value corresponding to a distance between the work object and each target candidate object.

In a specific example, the contact degree calculation unit 230 calculates, as a value corresponding to the distance, an inverse number d(i) of a distance value expressing the distance, as indicated in [Formula 2]. In this example, the contact degree calculation unit 230 calculates a distance between the centroid u of the work object and the centroid go(i), as a distance between the work object and the target candidate object C(i), and calculates the inverse number d(i) of the calculated distance value.

$$d(i) = \|go(i) - U\|^{-1} \qquad [\text{Formula 2}]$$

(Step S303)

The contact degree calculation unit 230 calculates a score that expresses a degree of contact by quantification.

In a specific example, the contact degree calculation unit 230 calculates a score $S(i)(=W(i) \cdot d(i))$ corresponding to the target candidate object C(i) with using the weight W(i) and the inverse number d(i) of the distance value. The score S(i) is an index that shows likelihood that the target candidate object C(i) is the work target of the user. The larger a value of the score S(i), the more likely the target candidate object C(i) is the work target of the user.

(Step S304)

The contact degree calculation unit 230 outputs output information including the obtained score. The contact degree calculation unit 230 may rearrange target candidate objects in a descending order in accordance with corresponding scores S, and may link each target candidate object and a score corresponding to each target candidate object and output them. The contact degree calculation unit 230 may output only scores equal to or higher than a predetermined reference value.

In the following, assume that the output information outputted by the contact degree calculation unit 230 includes attribute information of the target candidate object and a score corresponding to the target candidate object. The output information may include information of the occupied region of the target object. In a specific example, the information of the occupied region is information indicating a set of position coordinates constituting the occupied region.

In a case where the contact degree calculation unit 230 finds a contact index on a basis of a value other than (1) Distance, also, a specific example of a process flow is as illustrated in FIG. 5. Description will be made below mainly about a difference from the process flow mentioned in (1) Distance.

(2) Overlapping Region

A specific example in which the contact degree calculation unit 230 finds the contact index on a basis of the overlapping region will now be described. The contact degree calculation unit 230 calculates the score such that the larger a region where an occupied region corresponding to the target candidate object and an occupied region corresponding to the work object overlap, the larger a value of the score corresponding to the target candidate object.

Figure 6:
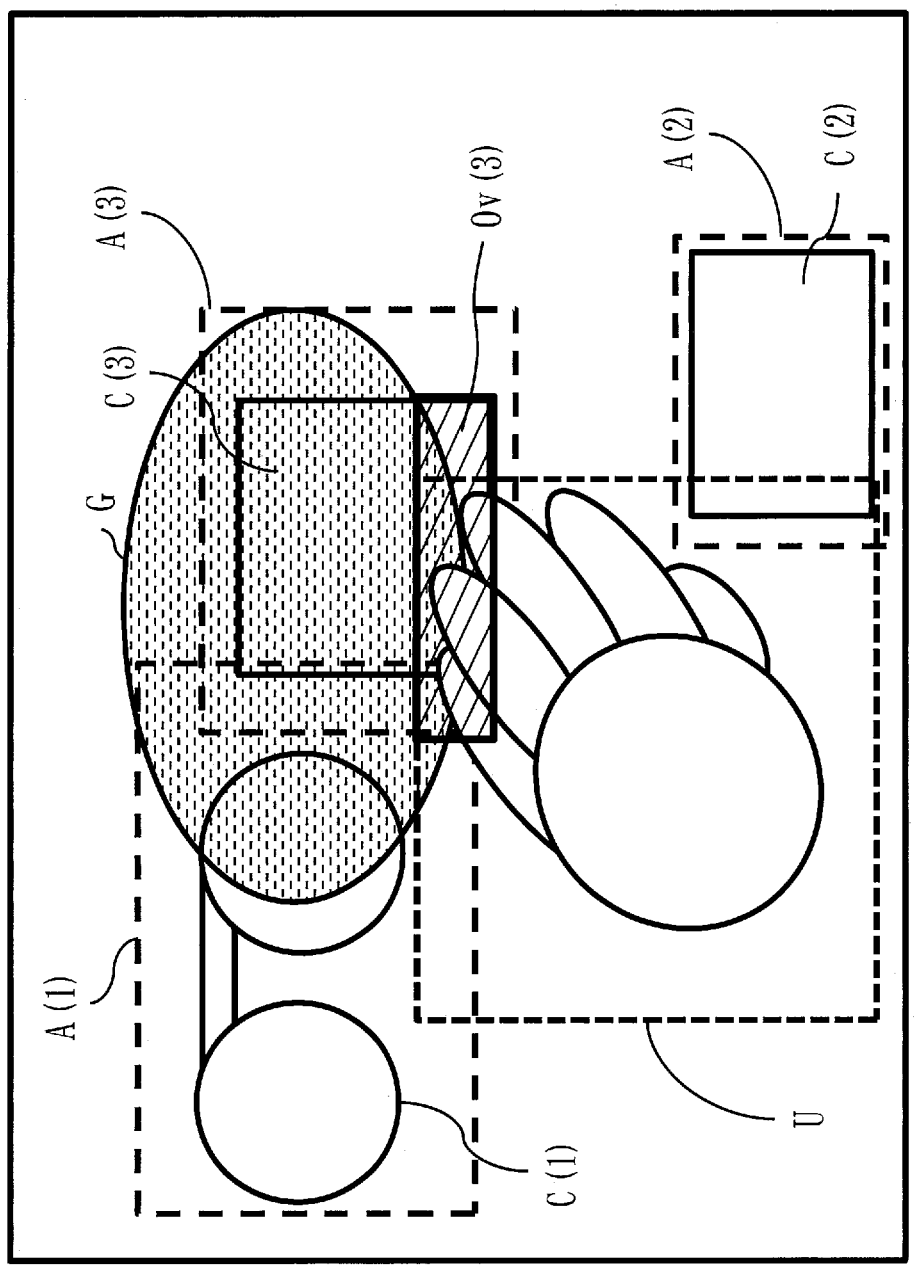
FIG. 6 is a diagram explaining processing of the contact degree calculation unit 230 according to Embodiment 1.

FIG. 6 illustrates a specific example of the processing of the contact degree calculation unit 230. FIG. 6 is similar to FIG. 4. An occupied region U is an occupied region corresponding to the hand which is a work object.

(Step S301)

The contact degree calculation unit 230 calculates an occupied region A(i) corresponding to each target candidate object C(i).

(Step S302)

The contact degree calculation unit 230 calculates a size of a region where the occupied region A(i) and the occupied region U overlap.

In a specific example, the contact degree calculation unit 230 calculates a proportion A1(i)(=|A(i)∩U|/|A(i)|) of an area of the region where the occupied region A(i) and the occupied region U overlap to an area of the occupied region A(i).

(Step S303)

The contact degree calculation unit 230 calculates the score.

In a specific example, the contact degree calculation unit 230 calculates a score S(i)(=W(i)·A1(i)) on a basis of the proportion A1(i).

The contact degree calculation unit 230 may calculate the proportion A1(i) on a basis of a region ((A(i)∩G)∩U) where the occupied region A(i), the watching region G, and the occupied region U overlap, instead of on a basis of a region (A(i)∩U) where the occupied region A(i) and the occupied region U overlap.

(3) Distance and Direction 1

A specific example in which the contact degree calculation unit 230 finds the contact index on a basis of distance and direction will be described below. The contact degree calculation unit 230 calculates the score having a feature mentioned in (1) Distance, such that the nearer a direction of the work object with respect to the target candidate object and a direction of the work object, the larger a value of the score corresponding to the target candidate object.

Figure 7:
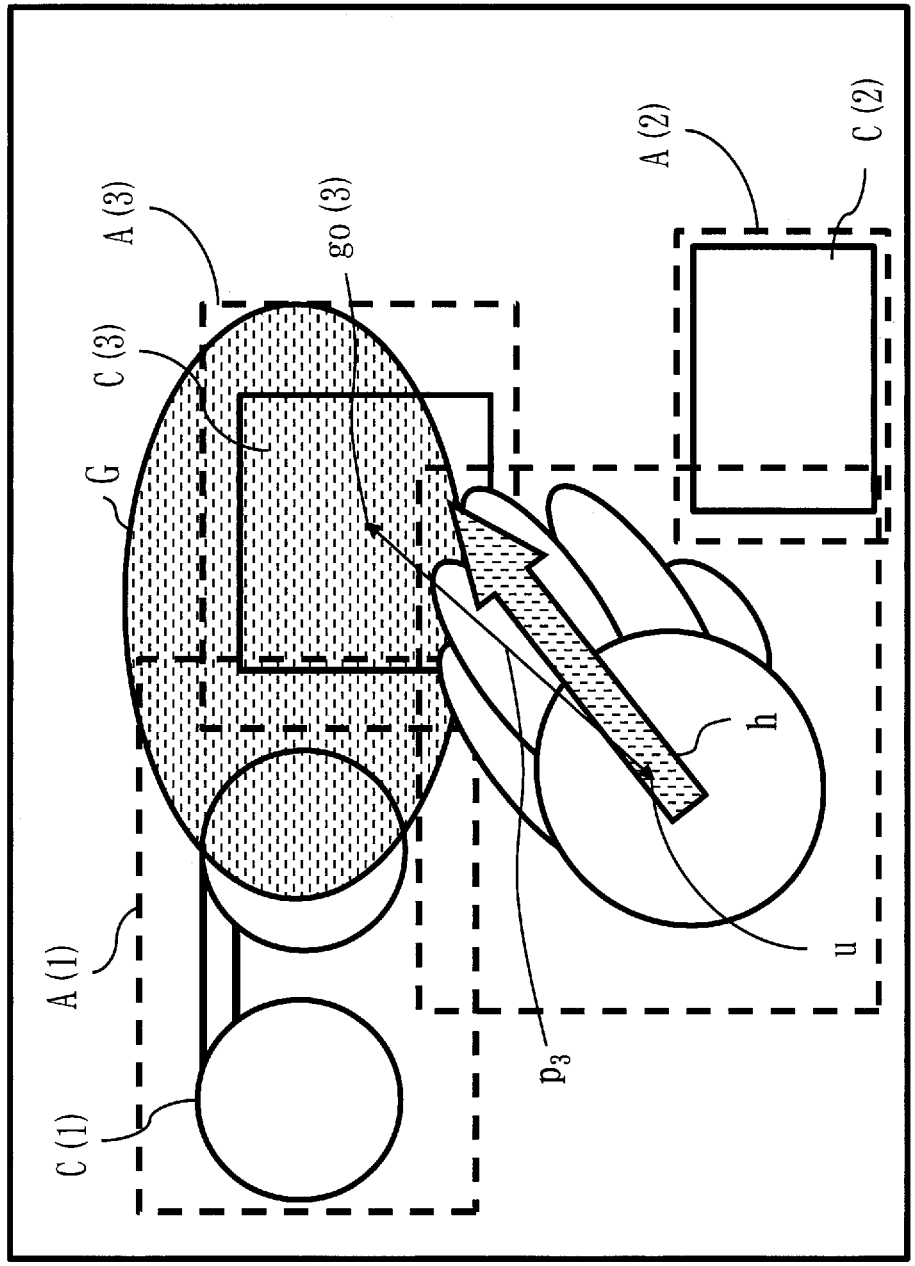
FIG. 7 is a diagram explaining processing of the contact degree calculation unit 230 according to Embodiment 1.

FIG. 7 illustrates a specific example of the processing of the contact degree calculation unit 230. FIG. 7 is similar to FIG. 4. A vector $p_i$ indicates a position of the target candidate object C(i) relative to a position of the work object. In a specific example, a direction of the vector $p_i$ is a direction from the centroid u as a start point to the centroid go(i) as an end point. A vector h is a unit vector that indicates a direction of the work object. In a specific example, the contact degree calculation unit 230 may treat, as the direction of the vector h, a direction of a first eigenvector obtained by executing a principal component analysis on a region indicating a hand of the user detected by the hand detection unit 213, or a direction obtained by utilizing information indicating a joint position of a finger of the user detected from a pickup image or a sight video. When the work object is a tool, the contact degree calculation unit 230 may calculate the direction of the vector h by utilizing a direction of the tool when the user uses the tool. The direction of the tool is defined in advance.

(Step S301)

The contact degree calculation unit 230 executes the same process as in step S301 mentioned in (1) Distance.

(Step S302)

The contact degree calculation unit 230 calculates a value corresponding to the distance and a value corresponding to the direction.

In a specific example, first, the contact degree calculation unit 230 calculates the value corresponding to the distance in the same manner as in step S302 mentioned in (1) Distance.

Next, the contact degree calculation unit 230 quantifies a degree of contact between the target candidate object and the work object by utilizing the direction of the work object. In a specific example, the contact degree calculation unit 230 calculates, as the degree of contact, an inner product Δ indicating a difference between the vector p and the vector h, as indicated in [Formula 3]. In this example, the near the direction of the work object to a direction pointing to the centroid of the target candidate object C(i), the larger a value of an inner product Δ(i) which is the degree of contact. The inner product Δ(i) indicates to what extent the work object is directed toward the target candidate object C(i).

$$\Delta(i) = p_i \cdot h / \|p_i\|$$ [Formula 3]

(Step S303)

The contact degree calculation unit 230 calculates the score.

In a specific example, the contact degree calculation unit 230 calculates a score S(i)(=W(i)·f(d(i), Δ(i))) on a basis of the weight W(i), an inverse number d(i) of the distance value, and the inner product Δ(i). Note that the function f is a function that associates input variables, that is, the inverse number d(i) of the distance value and the inner product Δ(i). The function f may be a function that combines the input variables linearly, or may be a function that associates the input variables non-linearly.

(4) Overlapping Region and Direction

A specific example in which the contact degree calculation unit 230 finds the contact index on the basis of an overlapping region and a direction will be described below. The contact degree calculation unit 230 calculates a score having: a feature of the score mentioned in (2) Overlapping Region; and a feature of the score calculated on the basis of a direction, as mentioned in (3) Distance and Direction 1.

Figure 8:
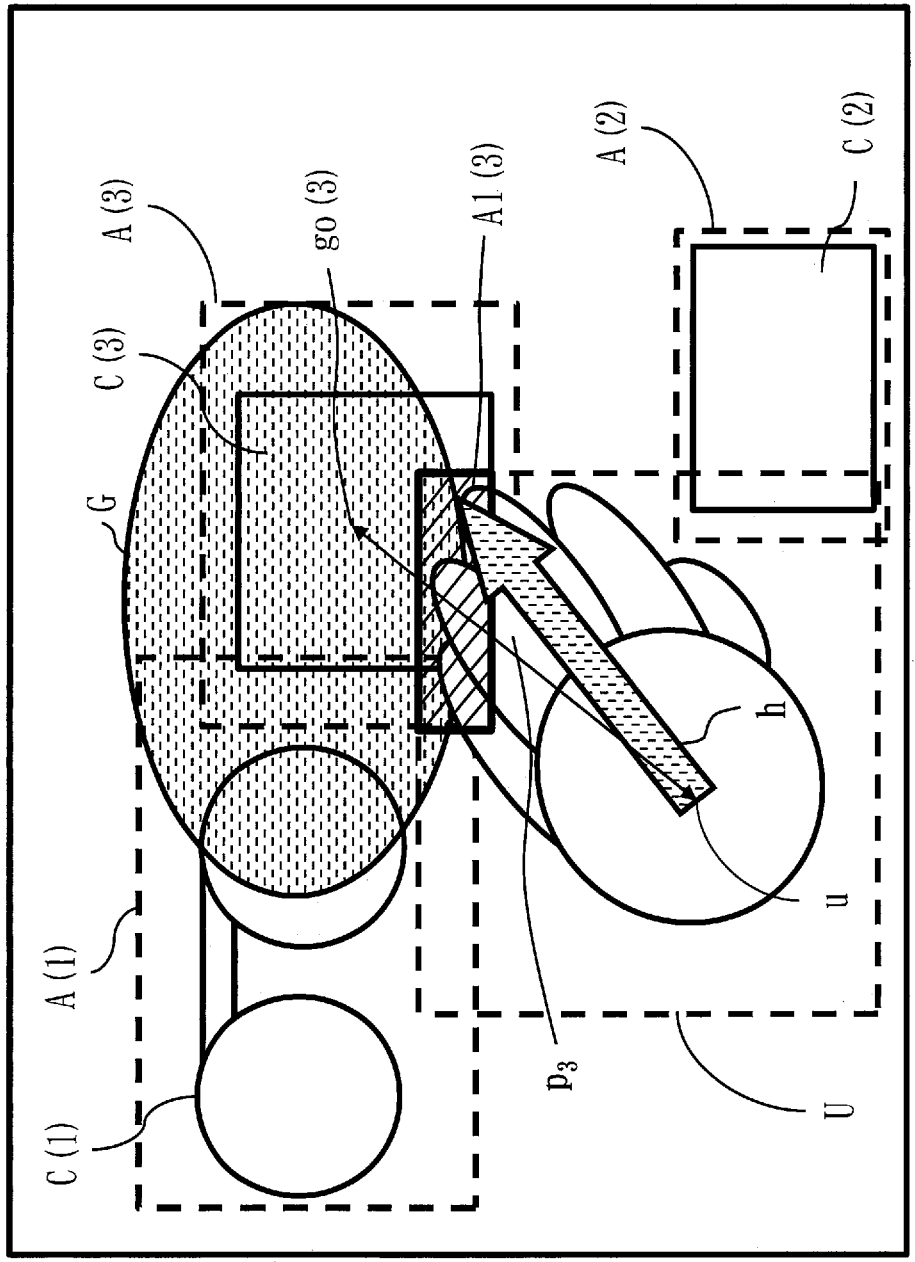
FIG. 8 is a diagram explaining processing of the contact degree calculation unit 230 according to Embodiment 1.

FIG. 8 illustrates a specific example of the processing of the contact degree calculation unit 230. FIG. 8 is similar to FIGS. 4, 6, and 7.
(Step S301)
The contact degree calculation unit 230 executes the same process as in step S301 mentioned in (1) Distance.
(Step S302)
The contact degree calculation unit 230 calculates a size of an overlapping region as in step S302 mentioned in (2) Overlapping Region. The contact degree calculation unit 230 quantifies a degree of contact between the target candidate object and the work object by utilizing the direction of the work object, as in step S302 mentioned in (3) Distance and Direction 1.

In the following, assume that in step S302, the contact degree calculation unit 230 has calculated the proportion A1(i) and the inner product Δ(i).
(Step S303)
The contact degree calculation unit 230 calculates the score.

In a specific example, the contact degree calculation unit 230 calculates a score $S(i)(=W(i) \cdot f(A1(i), \Delta(i)))$ on a basis of the proportion A1(i) and the inner product Δ(i). Note that the function f is the same as the function f described above.
(5) Distance and Direction 2

The contact degree calculation unit 230 may find a multi-dimensional vector as the score. In a specific example, the score S(i) with respect to the object C(i) is a two-dimensional vector indicated below.

$$S(i)=[W(C(i)),f(d(i),\Delta(i))]$$

Here, W(C(i)) expresses a weight by the watching region, and f(d(i), Δ(i)) expresses a calculated value representing a positional relationship of the work object with respect to the object C(i). The contact degree calculation unit 230 may find W(C(i)) by a calculation method indicated in (1) to (4) described above, or by a following calculation method.

$$W(C(i))=|C(i)[x,y]-g(x,y)|$$

Here, C(i)[x, y] expresses a position of the object C(i), and g(x, y) expresses a position of viewpoint. That is, the weight obtained by this formula is a weight that conforms to a distance between a position of each object and a position of viewpoint.
(Step S104: Work Estimation Process)

The work estimation unit 250 estimates work the user is doing, with using information outputted by the tool detection unit 212 and indicating a tool, or information outputted by the hand detection unit 213 and indicating a hand of the user, and using the score outputted by the contact degree calculation unit 230. In a specific example, the work estimation unit 250 estimates the work the user is doing, with using one or the other of: (i) a rule-based estimation technique; and (ii) a machine-learning-based estimation technique. The individual techniques will be described specifically. Assume that the work object is a hand of the user, that an object A, an object B, and an object C which are target candidate objects are inputted, and that a score of the object A is the largest.
(i) Rule-Based Estimation Technique A case will be studied where work labels indicating works corresponding to combinations of individual work objects and individual target candidate objects are defined in advance. In this case, the work estimation unit 250 may estimate the work of the user by searching for a work label corresponding to a combination of the "hand" of the user and the "object A".

A case will be studied where the relevant work labels are not defined and one work label is assigned to each of all combinations of the inputted target candidate objects and the scores. In this case, the work estimation unit 250 may estimate the work by utilizing all the inputted target candidate objects and a score corresponding to each target candidate object.

When both a hand and a tool appear in a pickup image, the work estimation unit 250 may decide that the relevant tool is a work object and that the relevant hand is not a work object highly likely, and may estimate the work of the user by searching for a work label corresponding to a combination of the relevant tool and a target candidate object the relevant tool is in contact with.
(ii) Machine-Learning-Based Estimation Technique The work estimation unit 250 estimates the work of the user by inputting a combination of information of the target candidate object appearing on the pickup image and a score corresponding to the target candidate object, to a learned discrimination machine that has done learning by statistical machine learning. The work estimation unit 250 may utilize the behavior recognition technique described in Patent Literature 1.

The work estimation unit 250 finds, as a feature amount, data in which information of the target candidate object and information of a work object are associated, and estimates a label corresponding to work or behavior corresponding to the obtained feature amount, with using a learned model. In a specific example, the work estimation unit 250 generates learning data D1 in which associating has been done by a graph structure or the like, and inputs the generated learning data D1 to a discrimination machine capable of processing a graph structure such as Graph Neural Network and a graph-embedded structure and having done learning in schematical machine learning, thereby estimating the work of the user.

Figure 9:
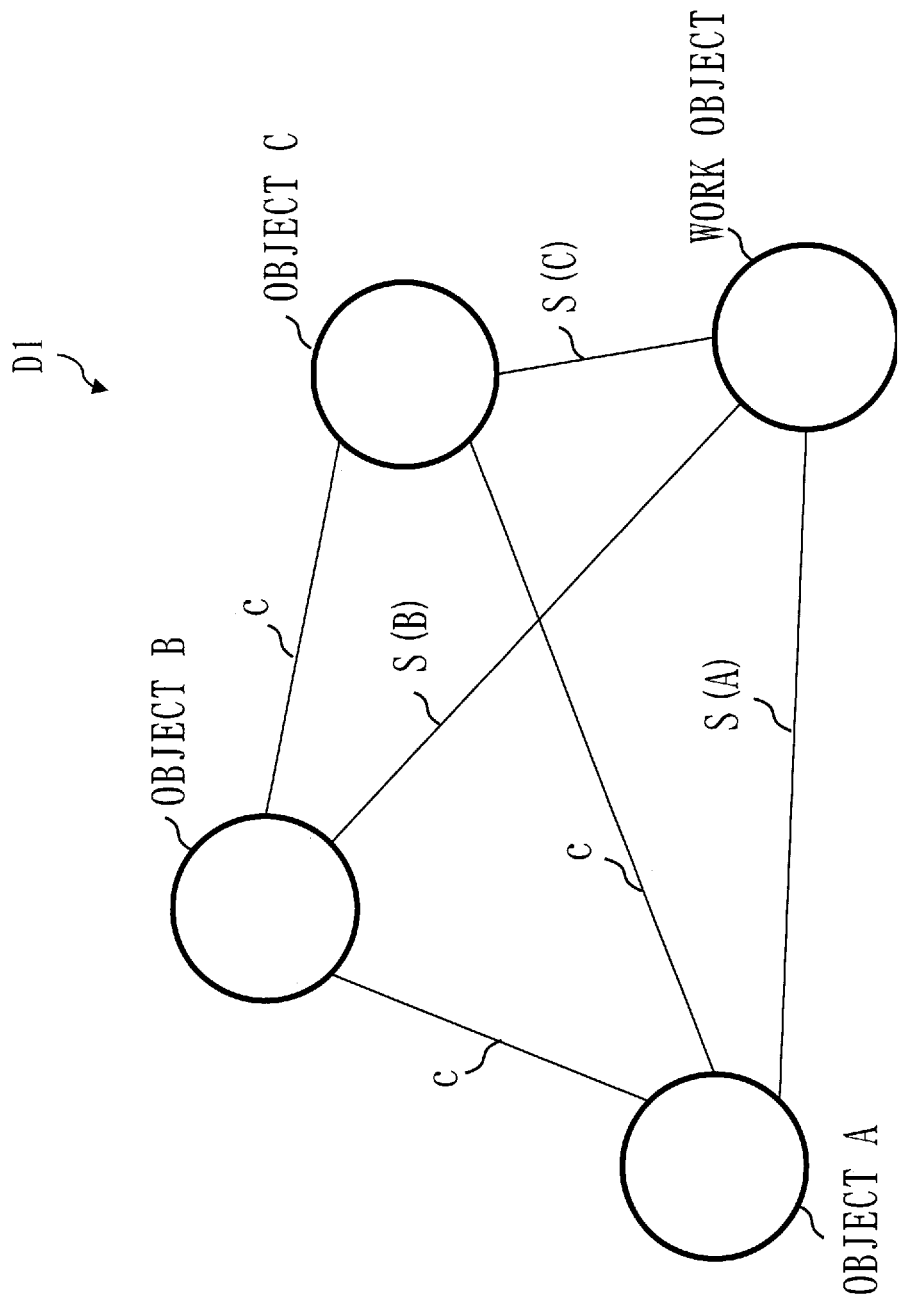
FIG. 9 presents a specific example of learning data D1 according to Embodiment 1.

FIG. 9 illustrates a specific example of the learning data D1 generated with using a graph. In this example, a graph node is a label expressing an object. A value of an edge between a node expressing a work object and a node expressing a target candidate object is a value of a score calculated by the contact degree calculation unit 230. A value of a node between target candidate objects is an arbitrary fixed value c. Note that the node may include information indicating a position of the object in a sight video, information of a size of an occupied region with respect to the object, and so on, in addition to a label expressing the object. When expressing a hand of the user by a node, the node may include information of the hand's position and direction. If information indicating a finger's joint is available, the node may include information indicating the joint. When expressing, by a node, a tool the user uses, the node may include information indicating a position, a direction, and an occupied region of the tool, in addition to a type of the tool.

Furthermore, when the work estimation device 200 acquires time-series data from each of the imaging device 300 and the line-of-sight measurement device 350, the work estimation unit 250 may generate data with using a detection result of an object corresponding to data of each time point in each time-series data, or with using a positional relationship of the objects, and may employ a machine learning technique in which an order of the generated data pieces in a time series is considered. In a specific example, the work estimation unit 250 may use Temporal Convolutional Network.

Figure 10:
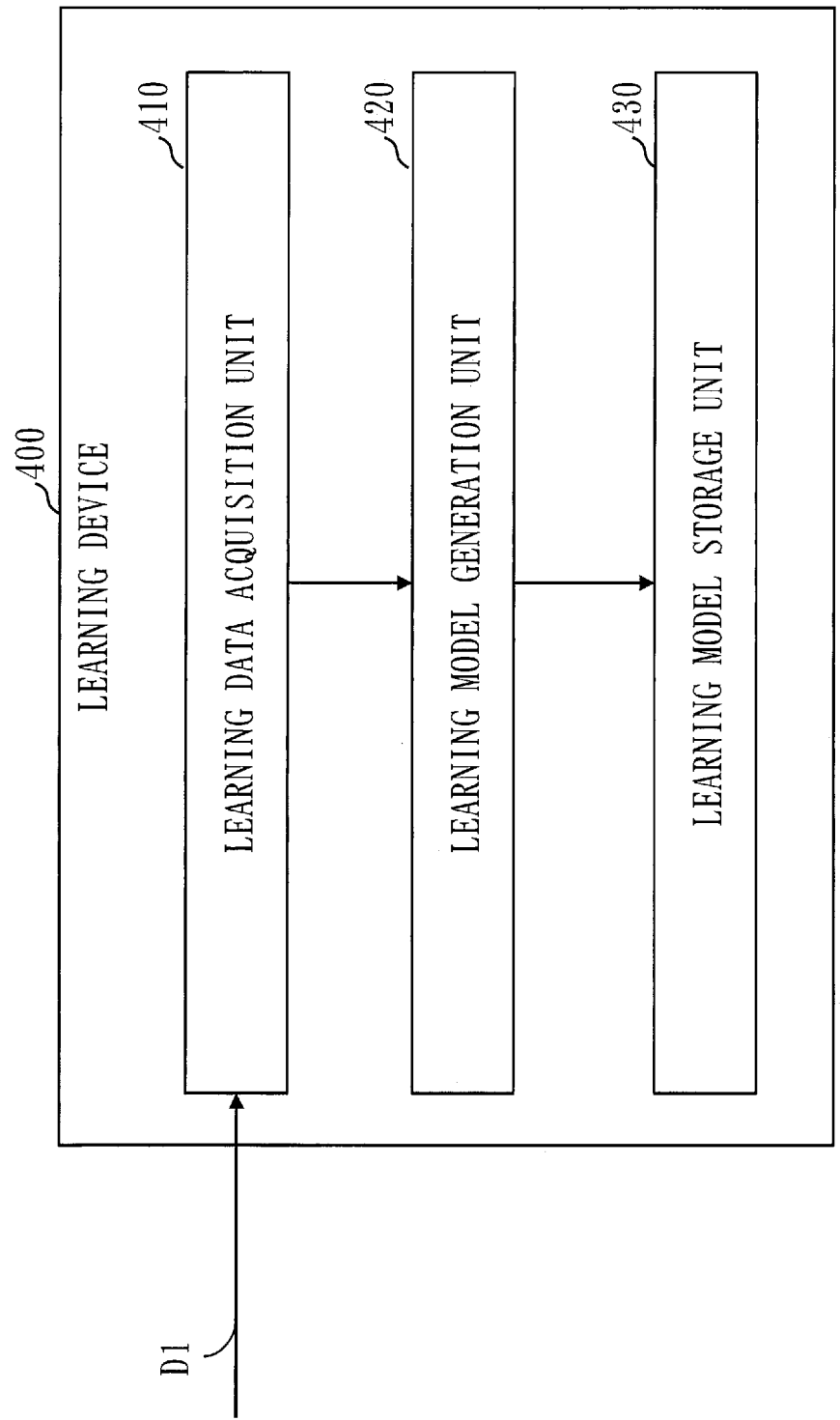
FIG. 10 presents a configuration example of a learning device 400 according to Embodiment 1.

In general, when utilizing the machine-learning-based estimation technique, a process of collecting learning data and a process of generating a learning model are needed. The learning data is data for learning and is used for generating the learning model. FIG. 10 illustrates a configuration example of a learning device 400 that executes these processes. The learning device 400 is provided with a learning data acquisition unit 410, a learning model generation unit 420, and a learning model storage unit 430. The learning model storage unit 430 may be located outside of the learning device 400. The learning device 400 may be constituted integrally with the work estimation device 200. A hardware configuration of the learning device 400 may be the same as a hardware configuration of the computation machine 100.

The learning data acquisition unit 410 acquires the learning data D1 as the learning data. Assume that the learning data D1 is data that can be inputted to the work estimation unit 250. This data includes data the work estimation unit 250 can use when estimating the work of the user.

The learning model generation unit 420 constructs a learning model that can process data acquired by the learning data acquisition unit 410, and generates a learned model by executing learning on a basis of the constructed learning model. The learning model is also called machine learning model.

The learning model storage unit 430 stores the learned model generated by the learning model generation unit 420.

Figure 11:
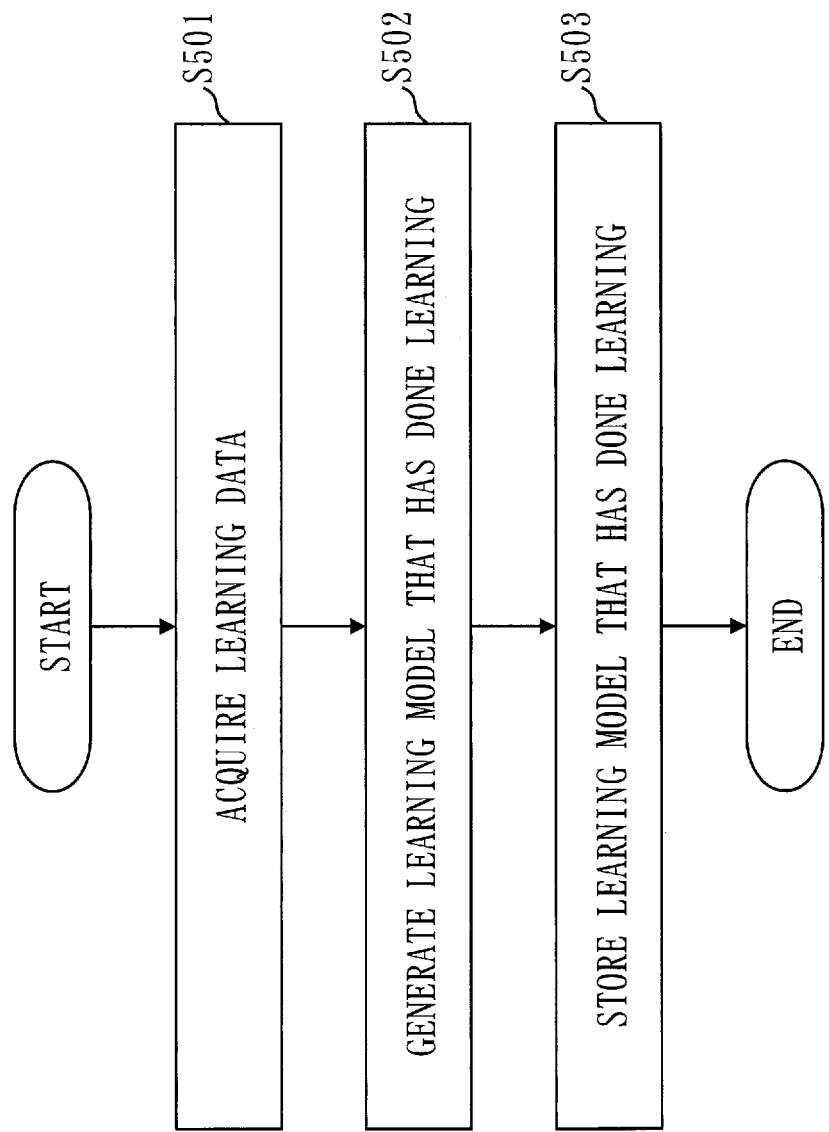
FIG. 11 is a flowchart illustrating operations of the learning device 400 according to Embodiment 1.

FIG. 11 illustrates an example of a learning process flow. The processing of the learning device 400 will be described with referring to FIG. 11.

(Step S501)

The learning data acquisition unit 410 acquires, as learning data, data that can be inputted to the work estimation unit 250, and expresses the acquired learning data as data indicating: information indicating an object that can serve as a work target; information indicating a work object; and information having a format that associates the information indicating the object that can serve as the work target and the information indicating the work object. The learning data includes at least one or the other of: information indicating a watching region; and information indicating a score corresponding to the object. In a specific example, when associating a plurality of pieces of information, the learning data acquisition unit 410 may use data whose elements are values expressing a positional relationship with respect to the individual objects, or may use a graph structure as illustrated in FIG. 9. The learning data acquisition unit 410 attaches a label expressing work behavior to the generated data.

(Step S502)

The learning model generation unit 420 generates the learning model by processing the learning data acquired by the learning data acquisition unit 410.

In a specific example, a case where the learning data indicates a graph structure will be studied. In this case, the learning data acquisition unit 410 may utilize, as the learning model, a machine learning model such as Graph Neural Network that can process a graph structure, or may utilize a model that can vectorize the learning data with utilizing a graph embedding technique and after that can process the vectorized learning data. When performing learning by considering data correlation at individual time points of time-series data, in a specific example, the learning model generation unit 420 may exploit a model such as Temporal Convolutional Network.

(Step S503)

The learning model storage unit 430 stores the learning model which is generated by the learning model generation unit 420 and which has done learning.

(Step S105: Estimation Result Storing Process)

The estimation result storage unit 260 stores an output from the work estimation unit 250.

Description of Effect of Embodiment 1

As described above, according to the present embodiment, work target candidates are narrowed down by utilizing the watching region of the user, in addition to the combinations of the work object and the target candidate objects existing within the video seen from the viewpoint of the user. From among the narrowed-down candidates, a score corresponding to an object the user is in contact with through a hand or a tool is obtained. The work of the user is estimated on a basis of the obtained score. Specifically, the contact degree calculation unit 230 executes two-stage processing of narrowing down the target candidate objects on a basis of the watching region G by the processes of step S301 through step S304, and after that detecting contact with the narrowed-down candidate objects. Thus, according to the present embodiment, not only the work the user does can be estimated with a relatively high precision, but also occlusion by the work object can be prevented. Therefore, according to the present embodiment, robustness against estimation of the work of the user is improved.

When an apparatus as a target of maintenance and inspection is the work target object, a plurality of inspecting portions which are work target candidates are often close to each other. Therefore, it is difficult to estimate inspection work corresponding to a specified portion from only a combination of objects. According to the present embodiment, the target candidates are narrowed down by the watching region, and after that contact of a hand or tool with target candidate objects is detected. Hence, even if the target candidate objects are close to each other, the work of the user for an object which is the target of the work of the user can be estimated with a relatively high precision.

Other Configurations

<Modification 1>

The work estimation unit 250 may estimate the work by exploiting not only the score but also other information. In a specific example, the other information is at least attribute information of each target candidate object or attribute information of the work object. Here, the attribute information is at least any one of: object position information; scale information; object shape; and a detection certainty factor which is to be described later.

A case where the other information is attribute information will be described. The learning data acquisition unit 410 acquires, as learning data, information including attribute information of each target candidate object and attribute information of the work object. The learning model generation unit 420 generates a learning model by processing the learning data including the attribute information of each target candidate object and the attribute information of the work object.

<Modification 2>

The contact degree calculation unit 230 may calculate the score on a basis of a degree of contact between part of the user other than the hand, and the target object.

<Modification 3>

The contact degree calculation unit 230 may calculate the score by considering the degree of contact between the tool and a hand of the user.

According to the present modification, it is possible to prevent the work estimation device 200 from erroneously recognizing a tool displayed in a video of the sight but ignored, as a tool the user is using.

<Modification 4>

The work estimation unit 250 may estimate the work of the user when the user is working with using a plurality of work objects.

According to the present modification, the work estimation unit 250 can estimate the work of the user appropriately even if the user is working with using both hands.

<Modification 5>

Figure 12:
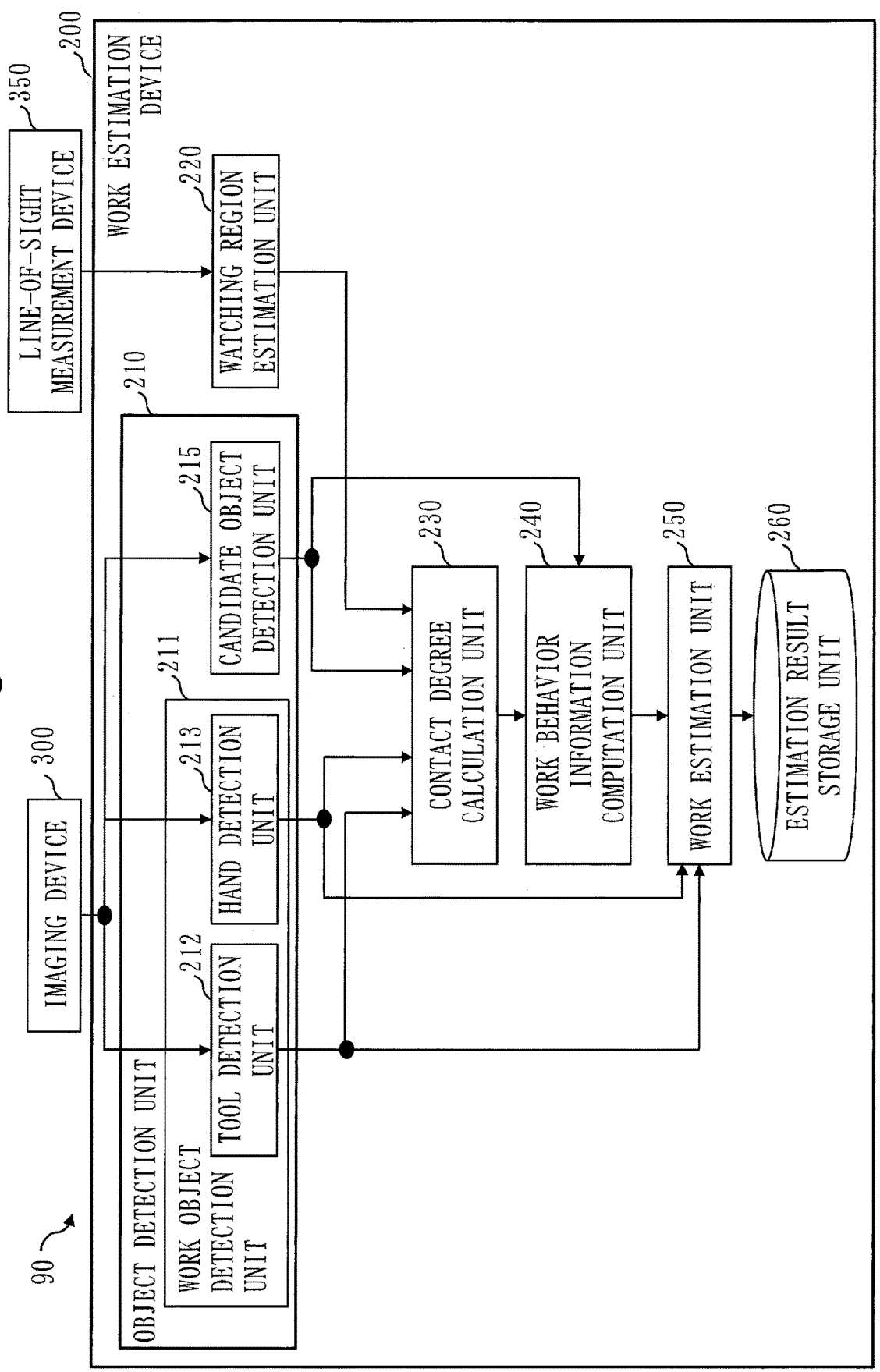
FIG. 12 presents a software configuration example of a work estimation device 200 according to a modification of Embodiment 1.

FIG. 12 illustrates a configuration example of a work estimation system 90 according to the present modification and a software configuration example of a work estimation device 200 according to the present modification. Description will be made below mainly regarding a difference between Embodiment 1 and the present modification.

As illustrated in FIG. 12, the work estimation device 200 is provided with a work behavior information computation unit 240, in addition to constituent elements provided to the work estimation device 200 according to Embodiment 1.

An object detection unit 210 finds a detection certainty factor about each target candidate object included in at least one target candidate object. The detection certainty factor is a value indicating an estimation accuracy degree of a detected target candidate object. The higher the detection certainty factor, the more accurate estimation of the target candidate object corresponding to the detection certainty factor. In a specific example, the detection certainty factor is an object classification probability calculated by a generally-employed object detection technique such as an SSD (single shot multibox detector) and a faster R-CNN (convolutional neural network).

The work behavior information computation unit 240 finds an update certainty factor by updating the detection certainty factor with using a contact degree. The work behavior information computation unit 240 is also called a target object score update unit. The update certainty factor is an index based on the contact degree.

The work estimation unit 250 estimates the work of the user on a basis of an output from the object detection unit 210 and an output from the work behavior information computation unit 240.

Figure 13:
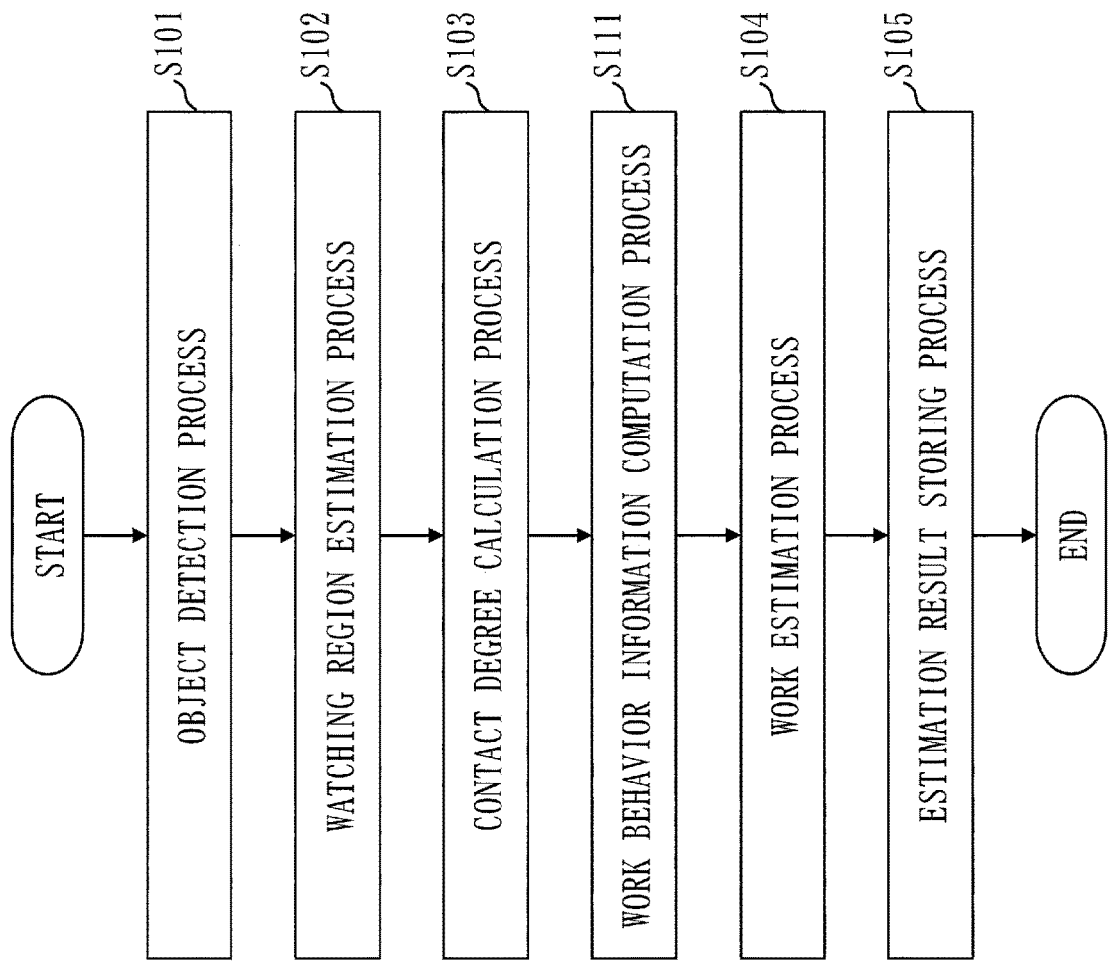
FIG. 13 is a flowchart illustrating operations of the work estimation device 200 according to the modification of Embodiment 1.

FIG. 13 is a flowchart illustrating an example of operations of the work estimation device 200. The operations of the work estimation device 200 will be described with referring to FIG. 13.

(Step S101: Object Detection Process)

A process of this step is the same as the process of step S101 according to Embodiment 1. The object detection unit 210, however, finds information including the detection certainty factor, as information corresponding to each detected target candidate object.

(Step S111: Work Behavior Information Computation Process)

The work behavior information computation unit 240 calculates the update certainty factor by updating the detection certainty factor outputted from a candidate object detection unit 215 and corresponding to each target candidate object, with using a score outputted from a contact degree calculation unit 230 and linked to each target candidate object, and outputs the calculated update certainty factor as a score.

Because of the process of this step, the work estimation device 200 can estimate the work of the user by considering not only the degree of contact of the user with an object that is the work target, but also the detection certainty factor calculated by the candidate object detection unit 215. The work behavior information computation unit 240 may hold both of the detection certainty factor and the score which is calculated by the contact degree calculation unit 230 and linked to the target candidate object. When calculating the update certainty factor, the work behavior information computation unit 240 may use at least one or the other of: position information of each object; and scale information of each object, or may use other information concerning each object.

(Step S104: Work Estimation Process)

A process of this step is the same as the process of step S104 according to Embodiment 1. The work estimation unit 250, however, uses the score outputted from the work behavior information computation unit 240, instead of the score outputted from the contact degree calculation unit 230.

<Modification 6>

Figure 14:
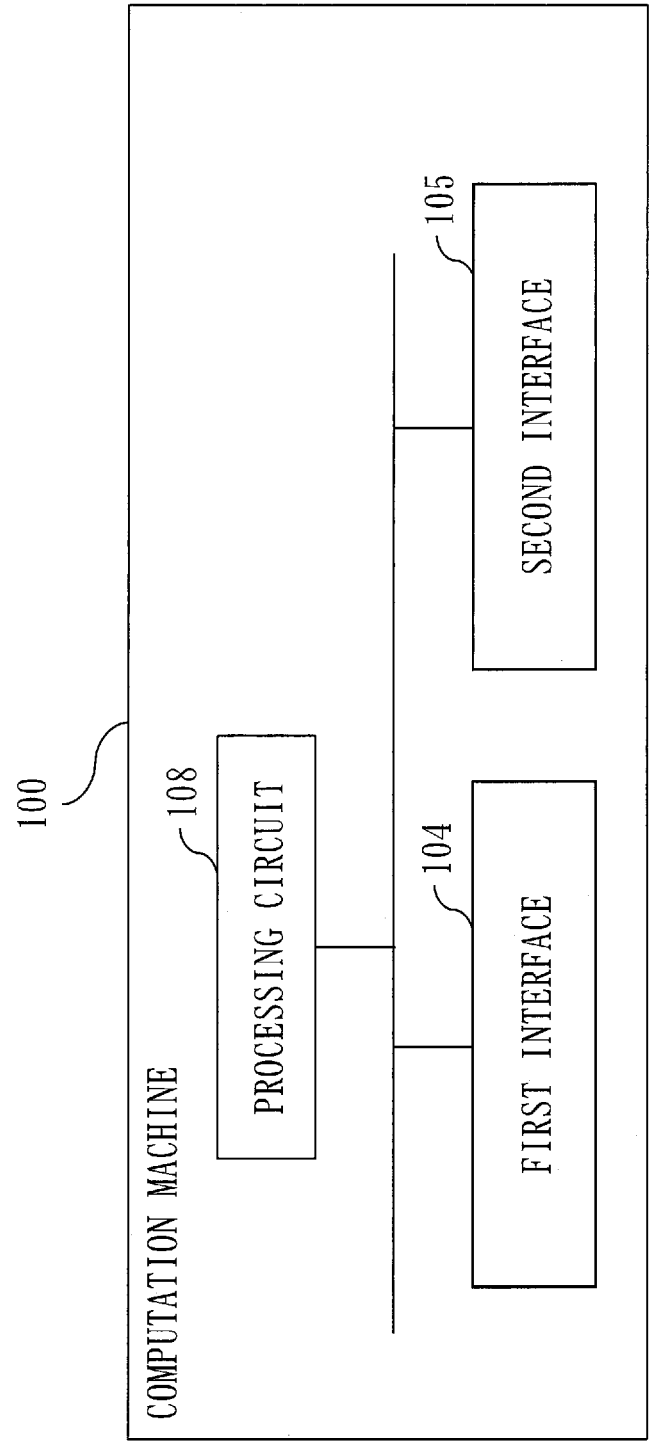
FIG. 14 presents a hardware configuration example of a work estimation device 200 according to a modification of Embodiment 1.

FIG. 14 illustrates a hardware configuration example of a work estimation device 200 according to the present modification.

The work estimation device 200 is provided with a processing circuit 108, in place of at least one of an arithmetic device 101, a main storage device 102, and an auxiliary storage device 103, as illustrated in FIG. 14.

The processing circuit 108 is hardware that implements at least some of units provided to the work estimation device 200.

The processing circuit 108 may be dedicated hardware, or may be a processor that runs a program stored in the main storage device 102.

When the processing circuit 108 is dedicated hardware, in a specific example, the processing circuit 108 is one or a combination of a single circuit, a composite circuit, a programmed processor, a parallel-programmed processor, an application specific integrated circuit (ASIC), and a field programmable gate array (FPGA).

The work estimation device 200 may be provided with a plurality of processing circuits that substitute for the processing circuit 108. The plurality of processing circuits share roles of the processing circuit 108.

In the work estimation device 200, some of functions may be implemented by dedicated hardware, and the remaining functions may be implemented by software or firmware.

In a specific example, the processing circuit 108 is implemented by one or a combination of hardware, software, and firmware.

The arithmetic device 101, the main storage device 102, the auxiliary storage device 103, and the processing circuit 108 are collectively referred to as "processing circuitry". That is, the functions of the function constituent elements of the work estimation device 200 are implemented by processing circuitry. This description about the present modification may apply to the other devices described in the present specification.

Other Embodiments

Embodiment 1 has been described. Out of the present embodiment, a plurality of portions may be practiced by combination. Alternatively, the present embodiment may be practiced partially. Also, the present embodiment may be changed in various manners as necessary. The present embodiment may be practiced as a whole, or may be practiced partially by any combination.

The embodiment described above is an essentially preferable exemplification, and is not intended to limit the present disclosure, an applied product of the present disclosure, and a scope of usage of the present disclosure. Procedures described with using a flowchart and so on may be changed as appropriate.

REFERENCE SIGNS LIST

90: work estimation system; 100: computation machine; 101: arithmetic device; 102: main storage device; 103: auxiliary storage device; 104: first interface; 105: second interface; 108: processing circuit; 200: work estimation device; 210: object detection unit; 211: work object detection unit; 212: tool detection unit; 213: hand detection unit; 215: candidate object detection unit; 220: watching region estimation unit; 230: contact degree calculation unit; 240: work behavior information computation unit; 250: work estimation unit; 260: estimation result storage unit; 300: imaging device; 350: line-of-sight measurement device; 400: learning device; 410: learning data acquisition unit; 420: learning model generation unit; 430: learning model storage unit; D1: learning data.

The invention claimed is:

1. A work estimation device comprising:
processing circuitry communicatively connected to first and second cameras, the first camera being user-worn and positioned to capture video images of a line of sight of a user, the second camera being positioned to capture video images of the user in a work environment, the processor being programmed
to perform image processing on video images received from the first camera to detect a watching region which is a region the user watches based on the line of sight of the user,
to perform image processing on video images received from the first and second camera to recognize a work object the user is using and at least one target candidate object which is a candidate for a work target of the user;
to perform image processing on video images received from the first and second camera to detect distance and overlap between pixels of the work object and of the recognized at least one target candidate object in the watching region, and calculate a contact degree indicating a degree of contact between the work object and each of the at least one target candidate object; and
to estimate work of the user on a basis of the contact degree between the work object and each of the at least one target candidate object, and record the results of the estimation of work in a log of work efficiency of the user,
wherein the processing circuitry
finds, about each target candidate object included in said at least one target candidate object, a detection certainty factor indicating to what degree said each target candidate object is estimated as being a work target of the user,
finds an update certainty factor by updating the detection certainty factor using the contact degree, and estimates the work of the user using the update certainty factor.

2. The work estimation device according to claim 1, wherein the processing circuitry calculates a weight corresponding to each target candidate object included in said at least one target candidate object on a basis of the watching region, and finds the contact degree using the calculated weight.

3. The work estimation device according to claim 1, wherein the processing circuitry estimates the watching region using time-series data indicating a position of a viewpoint of the user.

4. The work estimation device according to claim 1, wherein the processing circuitry finds the contact degree on a basis of disposition of the work object and disposition of each target candidate object which is included in said at least one target candidate object.

5. The work estimation device according to claim 1, wherein the processing circuitry finds the contact degree on a basis of a region where the work object and each target candidate object which is included in said at least one target candidate object overlap.

6. The work estimation device according to claim 1, wherein the work object is a hand of the user or a tool the user is using.

7. The work estimation device according to claim 1, wherein the processing circuitry estimates the work of the user by a rule-based estimation technique.

8. The work estimation device according to claim 1, wherein the processing circuitry estimates the work of the user using a learning model.

9. A work estimation method comprising:
controlling first and second cameras to capture video images of a user in a work environment, the first camera being worn by the user and positioned to capture video images of a line of sight of the user, the second camera being positioned to capture video images of the user in a work environment;
performing image processing on video images received from the first camera to detect a estimating a-watching region which is a region the user watches based on the line of sight of the user;
performing image processing on video images received from the first and second camera to recognize a work object the user is using and at least one target candidate object which is a candidate for a work target of the user;
performing image processing on video images received from the first and second camera to detect distance and overlap between pixels of the work object and each of the at least one target candidate object in the watching region, and calculating a contact degree indicating a degree of contact between the work object and each of the at least one target candidate object;
estimating work of the user on a basis of the work object and the contact degree between the work object and each of the at least one target candidate object, and recording the results of the estimation of work in a log of work efficiency of the user;
wherein the method
finds, about each target candidate object included in said at least one target candidate object, a detection certainty factor indicating to what degree said each target candidate object is estimated as being a work target of the user,
finds an update certainty factor by updating the detection certainty factor using the contact degree, and estimates the work of the user using the update certainty factor.

10. A non-transitory computer readable medium on which is recorded a work estimation program which causes a work estimation device being a computer to execute:
- a camera controlling process of controlling first and second cameras to capture video images of a user in a work environment, the first camera being worn by the user and positioned to capture video images of a line of sight of the user, the second camera being positioned to capture video images of the user in a work environment;
- a watching region estimation process of performing image processing on video images received from the first camera to detect a watching region which is a region the user watches based on the line of sight of the user;
- an object detection process of performing image processing on video images received from the first and second camera to recognize a work object the user is using and at least one target candidate object which is a candidate for a work target of the user, the work object and said at least one target candidate object;
- a contact degree calculation process of performing image processing on video images received from the first and second camera to detect distance and overlap between pixels of the work object and each of the at least one target candidate in the watching region, and calculating a contact degree indicating a degree of contact between the work object and each of the at least one target candidate object; and
- an estimated work logging estimation process of estimating work of the user on a basis of the work object and the contact degree between the work object and each of the at least one target candidate object, and recording the results of the estimation of work in a log of work efficiency of the user, wherein the object detection process includes finding, about each target candidate object included in said at least one target candidate object, a detection certainty factor indicating to what degree said each target candidate object is estimated as being a work target of the user, and the work estimation program further causes the work estimation device to execute:
- a work behavior information computation process of finding an update certainty factor by updating the detection certainty factor using the contact degree,
- wherein the work estimation process includes estimating the work of the user using the update certainty factor.

* * * * *